US012663987B2

(12) United States Patent
Tate

(10) Patent No.: US 12,663,987 B2
(45) **Date of Patent: *Jun. 23, 2026**

(54) SOFTWARE DEVELOPMENT DEVICE AND SOFTWARE DEVELOPMENT PROGRAM

(71) Applicant: connectFree Corporation, Kyoto (JP)

(72) Inventor: Kristopher Andrew Tate, Kyoto (JP)

(73) Assignee: CONNECTFREE CORPORATION, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/740,827

(22) Filed: Jun. 12, 2024

(65) Prior Publication Data

US 2024/0411554 A1 Dec. 12, 2024

Related U.S. Application Data

(63) Continuation of application No. 17/615,027, filed as application No. PCT/JP2020/020541 on May 25, 2020, now Pat. No. 12,045,608.

(30) Foreign Application Priority Data

May 31, 2019 (JP) ................................. 2019-103138

(51) Int. Cl.
*G06F 9/44* (2018.01)
*G06F 8/30* (2018.01)
(Continued)

(52) U.S. Cl.
CPC .................. *G06F 8/75* (2013.01); *G06F 8/30* (2013.01); *G06F 8/41* (2013.01)

(58) Field of Classification Search
CPC ..... G06F 8/41; G06F 8/76; G06F 8/30; G06F 8/42; G06F 8/425; G06F 8/75
See application file for complete search history.

(56) References Cited

U.S. PATENT DOCUMENTS 7,900,188 B2 * 3/2011 Costa ........................ G06F 8/34
717/113
9,448,820 B1 * 9/2016 Allen .................... G06F 9/5066
(Continued)

FOREIGN PATENT DOCUMENTS

CA 2746136 A1 1/2013
CN 105393216 A 3/2016
(Continued)

OTHER PUBLICATIONS

Abdullah Alshanqiti, Extracting Visual Contracts from Java Programs, 2015, pp. 1-11. https://ieeexplore.ieee.org/stamp/stamp.jsp?tp=&arnumber=7372000 (Year: 2015).*
(Continued)

*Primary Examiner* — Mongbao Nguyen
(74) *Attorney, Agent, or Firm* — Merchant & Gould P.C.

(57) ABSTRACT

There is provided an environment in which various constraints can be freely set for a program executed by an edge device or the like. A software development device for generating an object code from a source code includes: an evaluation means for extracting constraints set in a source code and evaluating whether or not the source code conforms to the constraints within an application range of the extracted restrictions; and a generation means for generating an object code so as to conform to the constraints.

6 Claims, 10 Drawing Sheets

(51) Int. Cl.

| | |
|---|---|
| *G06F 8/41* | (2018.01) |
| *G06F 8/75* | (2018.01) |
| *G06F 9/445* | (2018.01) |
| *G06F 9/45* | (2006.01) |
| *G06F 9/455* | (2018.01) |

(56) References Cited

U.S. PATENT DOCUMENTS

| | | | | |
|---|---|---|---|---|
| 9,588,871 | B1 * | 3/2017 | Estes, Jr. ................... | G06F 8/73 |
| 10,416,972 | B1 | 9/2019 | Forghani | |
| 10,740,470 | B2 * | 8/2020 | Ionescu ................. | G06F 21/563 |
| 10,866,792 | B1 | 12/2020 | Tomlin | |
| 11,216,255 | B1 * | 1/2022 | Berger ....................... | G06F 8/60 |
| 11,734,000 | B2 * | 8/2023 | Bryan ....................... | G06F 8/73 |
| | | | | 717/123 |
| 2004/0003112 | A1 | 1/2004 | Alles | |
| 2007/0169020 | A1 | 7/2007 | Kondoh | |
| 2013/0067155 | A1 | 3/2013 | Bates | |
| 2013/0219378 | A1 | 8/2013 | Glaister | |
| 2014/0143762 | A1 * | 5/2014 | Li .............................. | G06F 8/41 |
| | | | | 717/139 |
| 2015/0052506 | A1 | 2/2015 | Driscoll | |
| 2015/0268939 | A1 | 9/2015 | Kelapure | |
| 2015/0339104 | A1 | 11/2015 | Frenkiel | |
| 2016/0004517 | A1 | 1/2016 | Safary | |
| 2016/0124724 | A1 | 5/2016 | Gautam | |
| 2016/0147511 | A1 | 5/2016 | Eble | |
| 2016/0179479 | A1 * | 6/2016 | Bates ....................... | G06F 8/34 |
| | | | | 717/113 |
| 2017/0300306 | A1 * | 10/2017 | De ....................... | G06F 9/45529 |
| 2017/0315903 | A1 | 11/2017 | David | |
| 2017/0329582 | A1 * | 11/2017 | Steven ................ | G06F 11/3604 |
| 2018/0267783 | A1 | 9/2018 | Kawaguchi | |
| 2018/0293058 | A1 * | 10/2018 | Bierman ................. | G06F 8/436 |
| 2018/0349614 | A1 | 12/2018 | Ionescu | |
| 2019/0050210 | A1 * | 2/2019 | Van Der Jeugt .......... | G06F 8/35 |
| 2019/0129832 | A1 * | 5/2019 | Budnik ................. | G06F 40/205 |
| 2019/0163446 | A1 | 5/2019 | Brunel | |
| 2019/0171485 | A1 | 6/2019 | Bolkhovitin | |
| 2019/0258460 | A1 | 8/2019 | Schlachter | |
| 2019/0377662 | A1 | 12/2019 | Mitchell | |
| 2020/0026530 | A1 * | 1/2020 | Rose ....................... | G06F 9/547 |
| 2020/0073739 | A1 * | 3/2020 | Rungta ..................... | G06F 8/60 |
| 2020/0081693 | A1 * | 3/2020 | Moussa ..................... | G06F 8/42 |
| 2020/0201608 | A1 | 6/2020 | Wallbaum | |
| 2020/0225921 | A1 * | 7/2020 | Pelton ................... | G06F 30/323 |
| 2020/0293617 | A1 | 9/2020 | Luo | |

FOREIGN PATENT DOCUMENTS

| | | |
|---|---|---|
| CN | 106095408 A | 11/2016 |
| CN | 107885503 A | 4/2018 |
| CN | 109783107 A | 5/2019 |
| EP | 2172839 A1 | 4/2010 |
| JP | 2004038956 A | 2/2004 |
| JP | 2006285582 A | 10/2006 |
| JP | 2007122631 A | 5/2007 |
| JP | 2013140513 A | 7/2013 |
| KR | 101573586 B1 | 8/2013 |
| KR | 20180030349 A | 3/2018 |
| WO | 2015/023366 A1 | 2/2015 |

OTHER PUBLICATIONS

Niranjan Hasabnis, Extracting Instruction Semantics via Symbolic Execution of Code Generators, 2016, pp. 301-311. https://www.seclab.cs.sunysb.edu/seclab/pubs/eissec.pdf (Year: 2016).*

Jakub Míšek, Mapping of Dynamic Language Constructs into Static Abstract Syntax Trees, 2010, pp. 1-6. https://ieeexplore.ieee.org/stamp/stamp.jsp?tp=&arnumber=5590990 (Year: 2010).*

Arnaud Gotlieb, Euclide: A Constraint-Based Testing Framework for Critical C Programs, 2009, pp. 1-10, https://ieeexplore.ieee.org/stamp/stamp.jsp?tp=&arnumber=4815347 (Year: 2009).

Daniel Tang et al., "Static Checking of Safety Critical Java Annotations", JAVA Technologies for Real-Time and Embedded Systems: 148-154, sections 2 to 5 (2010).

Christian Wagner, Comparative Analysis of Tools for Automated Software Re-Engineering purposes, 2008, pp. 1-8, https://ieeexplore.ieee.org/stamp/stamp.jsp?arnumber=4463746 (Year: 2008).

Hendrik van Antwerpen, A Constraint Language for Static Semantic Analysis Based on Scope Graphs, 2016, pp. 49-60, https://dl.acm.org/doi/pdf/10.1145/2847538.2847543 (Year: 2016).

Gabor Gyimesi, Enforcing Techniques and Transformation of C/C++ Source Code to Heterogenous Hardware, 2016, pp. 1173-1180, https://ieeexplore.ieee.org/stamp/stamp.jsp?tp=&arnumber-7816976 (Year: 2016).

Taiwanese Office Action received for TW Application No. 113121808 on Apr. 9, 2025, 12 pgs.

* cited by examiner

Figure 3:
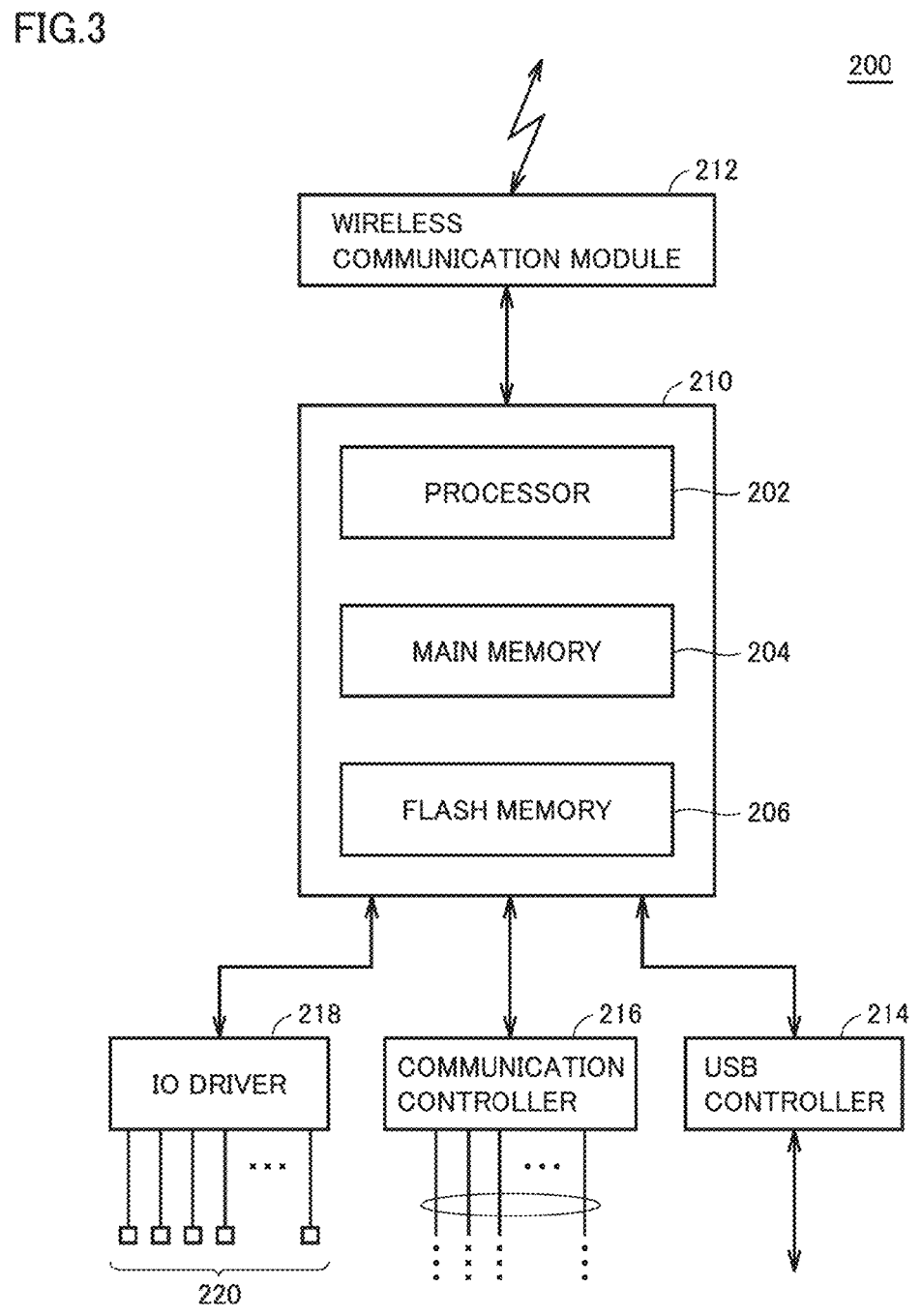

```
                                                            ┌─ 112
#include <znIOlib.h>
include <znVariable.h> void  main( )
{
    unsigned int OutValue;        // OUTPUT VALUE VARIABLE ──── 1121
    unsigned int OutAddrs;        // OUTPUT ADDRESS VARIABLE ── 1122

OutValue = fn1();             // ACQUISITION OF OUTPUT VALUE ── 1123
    OutVal(OutValue, 0x1000);     // WRITING (OUTPUT) OF OUTPUT VALUE ── 1124

. . .

}
```

(B)

```
                                                            ┌─ 112
#include <znIOlib.h>
include <znVariable.h> void  main( )
{
    $allowedAddressRange = 0x0000 . . . 0x0FFF             ── 1125 unsigned int OutValue;        // OUTPUT VALUE VARIABLE ──── 1121
    unsigned int OutAddrs;        // OUTPUT ADDRESS VARIABLE ── 1122

OutValue = fn1();              // ACQUISITION OF OUTPUT VALUE ── 1123
    OutVal(OutValue, 0x1000);      // WRITING (OUTPUT) OF OUTPUT VALUE ── 1124
                        │
    . . .           NON-EXECUTABLE

}
```

SCOPE OF
RESTRICTIONS

FIG.5

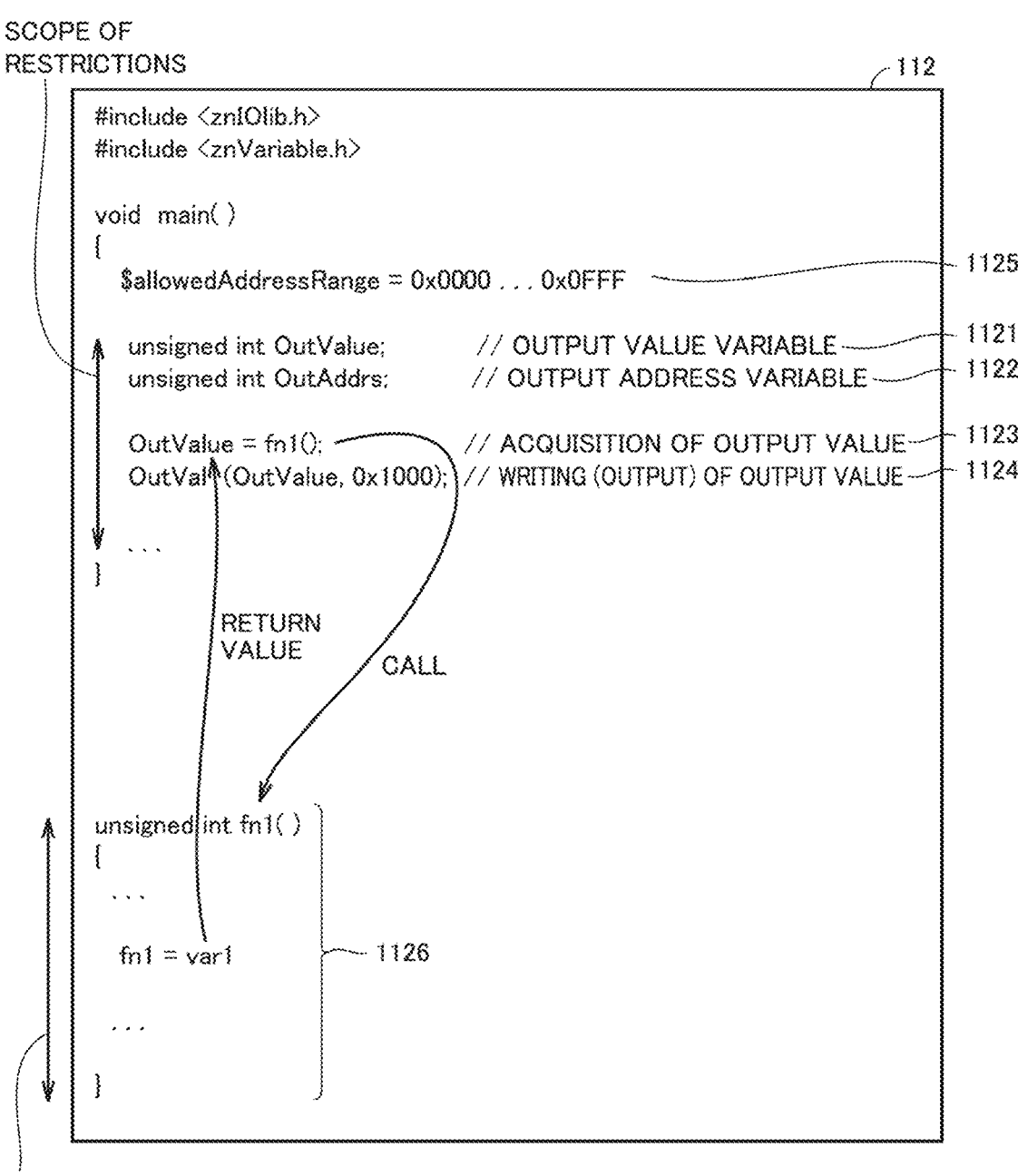

SCOPE OF
RESTRICTIONS

```
#include <znIOlib.h>
include <znVariable.h> void  main( )
{
    $allowedAddressRange = 0x0000 . . . 0x0FFF          —— 1125 unsigned int OutValue;        // OUTPUT VALUE VARIABLE —— 1121
    unsigned int OutAddrs;        // OUTPUT ADDRESS VARIABLE —— 1122

OutValue = fn1();             // ACQUISITION OF OUTPUT VALUE —— 1123
    OutVal (OutValue, 0x1000);    // WRITING (OUTPUT) OF OUTPUT VALUE —— 1124

. . .

}
```

RETURN
VALUE

CALL

```
unsigned int fn1( )
{
    . . .

fn1 = var1             —— 1126

. . .

}
```

SCOPE OF
RESTRICTIONS

```
                                                              ⌐112 include <znIOlib.h>
include <znVariable.h> void  main( )
{
    $allowedAddressRange = 0x0000 . . . 0x0FFF  ————————— 1125 unsigned int OutValue;      // OUTPUT VALUE VARIABLE ——— 1121
    unsigned int OutAddrs;      // OUTPUT ADDRESS VARIABLE —— 1122

OutValue = fn1();           // ACQUISITION OF OUTPUT VALUE — 1123
    OutVal(OutValue, 0x0100);   // WRITING (OUTPUT) OF OUTPUT VALUE — 1124

. . .

}
```

(B)

```
                                                              ⌐112 include <znIOlib.h>
include <znVariable.h> void  main( )
{
    $allowedAddressRange = 0x0000 . . . 0x0FFF  ————————— 1125 unsigned int OutValue;      // OUTPUT VALUE VARIABLE ——— 1121
    unsigned int OutAddrs;      // OUTPUT ADDRESS VARIABLE —— 1122
    unsigned int IniPtr;        // OUTPUT ADDRESS INITIAL VALUE VARIABLE — 1127

OutValue = fn1();           // ACQUISITION OF OUTPUT VALUE — 1123

. . . // PROCESS FOR DETERMINING OUTPUT ADDRESS INITIAL VALUE IniPtr — 1128

OutAddrs = IniPtr + 0F00;   // DETERMINATION OF OUTPUT ADDRESS — 1129

OutVal(OutValue, OutAddrs); // WRITING (OUTPUT) OF OUTPUT VALUE — 1130

GENERATION OF OBJECT CODE

S100
PERFORM LEXICAL ANALYSIS AND SYNTACTIC ANALYSIS ON INPUT SOURCE CODE

S102
ARE RESTRICTIONS SET? — NO

YES

S104
SELECT ONE OF SET RESTRICTIONS

S106
DOES SOURCE CODE INCLUDED IN SCOPE OF SELECTED RESTRICTION CONFORM TO RESTRICTION?

"UNKNOWN"

YES

NO

S108
OUTPUT MESSAGE INDICATING "NOT CONFORM TO RESTRICTION"

S110
INTERRUPT PROCESS OF GENERATING OBJECT CODE

END

S112
MARK PORTION WHERE IT CANNOT BE DETERMINED WHETHER OR NOT SOURCE CODE CONFORMS TO RESTRICTION

S114
HAS EVALUATION FOR ALL OF SET RESTRICTIONS BEEN COMPLETED? — YES

NO

S116
SELECT ONE OF UNEVALUATED RESTRICTIONS

A

S118
GENERATE OBJECT CODE

S120
IS PORTION WHERE IT CANNOT BE DETERMINED WHETHER OR NOT SOURCE CODE CONFORMS TO RESTRICTION MARKED? — NO

YES

S122
GENERATE OBJECT CODE FOR CONFORMITY EVALUATION

S124
OUTPUT GENERATED OBJECT CODE

END

SOFTWARE DEVELOPMENT DEVICE AND SOFTWARE DEVELOPMENT PROGRAM

TECHNICAL FIELD

The present disclosure relates to a software development device and a software development program.

BACKGROUND ART

The development of information and communication technology (ICT) has been remarkable in recent years, and devices connected to a network, such as the Internet, are not limited to information processing devices, such as conventional personal computers or smartphones, and are spreading to various things. Such a technology trend is called "IoT (Internet of Things)", and various technologies and services have been proposed and put into practical use. In the future, a world is envisioned in which billions of people on Earth and tens of billions or trillions of devices are connected at the same time. In order to realize such a networked world, it is necessary to provide a solution that is simpler, safer, and more freely connected.

With the intelligentization of devices used in IoT (also referred to as "edge devices"), it is necessary to create various kinds of programs. On the other hand, the resources available in the target device are often limited as compared with a personal computer and the like.

As an example of a method of creating a program in consideration of available resources, JP 2004-038956 A discloses a system for discovering and showing computing resources available in various computing devices and for exposing these resources as services that can be addressed by software applications.

CITATION LIST

Patent Document

Patent Document 1: JP 2004-038956 A

SUMMARY OF THE INVENTION

Problem to be Solved by the Invention

When creating a program executed by an edge device, it is necessary to consider various points in terms of available resources and security. However, Patent Document 1 described above only focuses on creating a program in consideration of the computing resources available in the target computing device, and does not provide a solution to the problem that various points should be considered when creating a program.

Means for Solving Problem

According to an aspect of the present disclosure, a software development device for generating an object code from a source code is provided. The software development device includes: an evaluation means for extracting constraints set in a source code and evaluating whether or not the source code conforms to the constraints within an application range of the extracted restrictions; and a generation means for generating an object code so as to conform to the constraints.

The generation means may stop the generation of the object code when it is evaluated that the source code does not conform to the constraints within the application range of the constraints.

When it cannot be evaluated whether or not the source code conforms to the constraints within the application range of the constraints, the generation means may generate another object code for evaluating whether or not the source code conforms to the constraints during execution of the object code in addition to the object code corresponding to the source code.

The constraints may include any one of restrictions or rules on resources used by the object code at the time of execution, restrictions or rules on an execution state of the object code, restrictions or rules on an execution procedure of the object code, and restrictions or rules on instructions included in the source code.

When a call instruction is included in the application range of the constraints, the evaluation means may evaluate whether or not an instruction called by the call instruction also conforms to the constraints.

According to another aspect of the present disclosure, a software development program for generating an object code from a source code is provided. The software development program causes a computer to execute: a step of extracting constraints set in a source code and evaluating whether or not the source code conforms to the constraints within an application range of the extracted constraints; and a step of generating an object code so as to conform to the constraints.

Effect of the Invention

According to the present disclosure, it is possible to provide an environment in which various constraints can be freely set for a program executed by an edge device or the like.

BRIEF DESCRIPTION OF DRAWINGS

FIG. 3 is a schematic diagram showing a hardware configuration example of a controller according to the present embodiment;

FIG. 4 is a diagram for describing constraints that can be set by the software development device according to the present embodiment;

FIG. 5 is a diagram for describing the scope of constraints that can be set by the software development device according to the present embodiment;

FIG. 6 is a diagram for describing a case where conformity to constraints that can be set by the software development device according to the present embodiment should be determined at the time of execution;

FIG. 7 is a block diagram showing a functional configuration provided by the software development device according to the present embodiment;

FIG. 9 is a flowchart showing a processing procedure for generating an object code from a source code in the software development device according to the present embodiment.

MODE(S) FOR CARRYING OUT THE INVENTION

Figure 1:
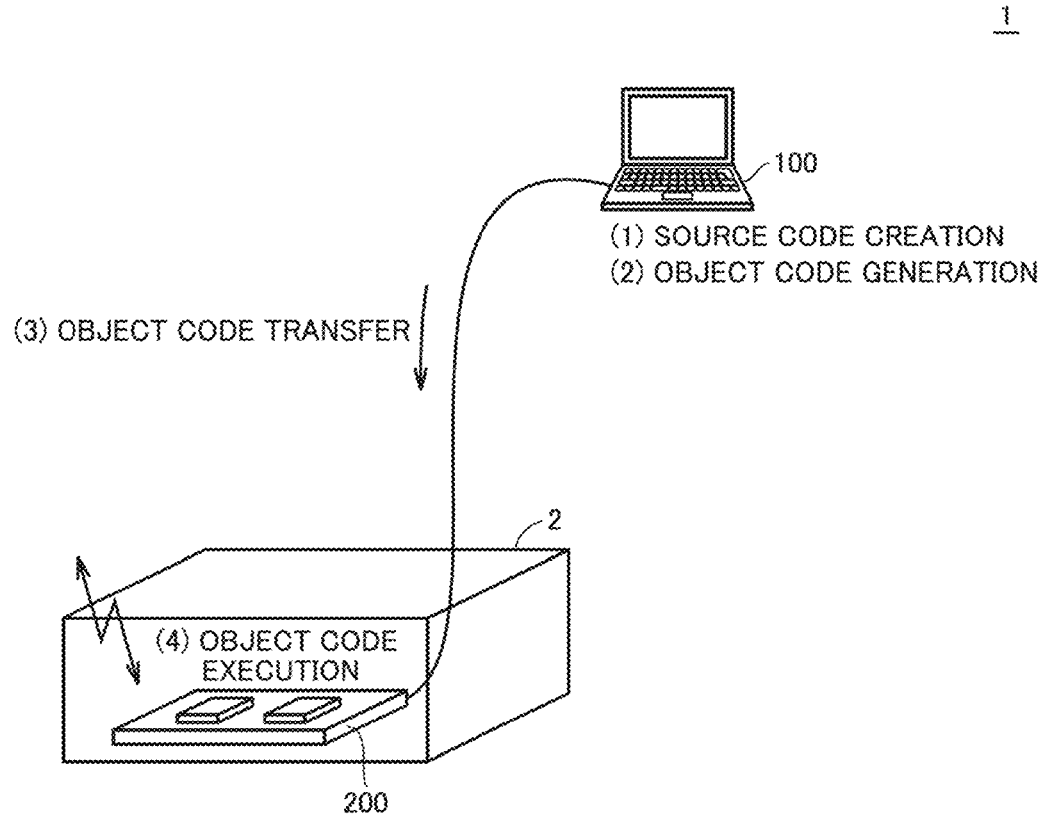
FIG. 1 is a schematic diagram showing an example of the overall configuration of an IoT system according to the present embodiment.

An embodiment according to the present disclosure will be described in detail with reference to the diagrams. In addition, the same or corresponding portions in the diagrams are denoted by the same reference numerals, and the description thereof will not be repeated.

In the following description, as a typical example, a case where a software development device 100 according to the present embodiment is applied to an IoT system will be described. However, the present disclosure can be applied to any system and any controller without being limited to the IoT system.

A. IOT SYSTEM 1

First, the overall configuration of an IoT system 1 including the software development device 100 according to the present embodiment and an edge device 2 will be described.

FIG. 1 is a schematic diagram showing an example of the overall configuration of the IoT system 1 according to the present embodiment. Referring to FIG. 1, in the IoT system 1, typically, a program (object code) executed by the edge device 2 is generated by the software development device 100. The generated program is transferred from the software development device 100 to a controller 200 included in the edge device 2.

An integrated development environment (IDE) is provided for the software development device 100, so that the user can create an arbitrary program in the integrated development environment. That is, the software development device 100 generates an object code from a source code that is arbitrarily created by the user.

The edge device 2 may be any device, but typically, factory facilities, various devices in the home, social infrastructure equipment, movable bodies such as vehicles, arbitrary portable devices, and the like are assumed. As will be described later, the controller 200 has a processor, so that it is possible to execute a program from the software development device 100.

An example of the processing procedure in the IoT system 1 will be described. First, the user creates a source code using the software development device 100 ((1) source code creation). Then, the created source code is compiled by the software development device 100 to generate an object code ((2) object code generation). The generated object code is transferred to the controller 200 of the edge device 2 ((3) object code transfer). The transferred object code is executed by the controller 200 ((4) object code execution).

By such a procedure, an arbitrary program developed by the software development device 100 can be executed by the controller 200.

As will be described later, the software development device 100 according to the present embodiment provides an environment in which various constraints can be freely set for the program executed by the controller 200. Typically, various constraints can be set arbitrarily for the program depending on the resources of the controller 200 in which the program is executed, the type and purpose of the edge device 2, the importance of the program to be executed, the security to be ensured, and the like. By setting such constraints, it is possible to realize an application using limited resources and prevent the unintended operation of the application.

B. HARDWARE CONFIGURATION EXAMPLE

Next, a hardware configuration example of a device included in the IoT system 1 according to the present embodiment will be described.

(b1: Software Development Device 100)

The software development device 100 is typically realized by a general-purpose computer.

Figure 2:
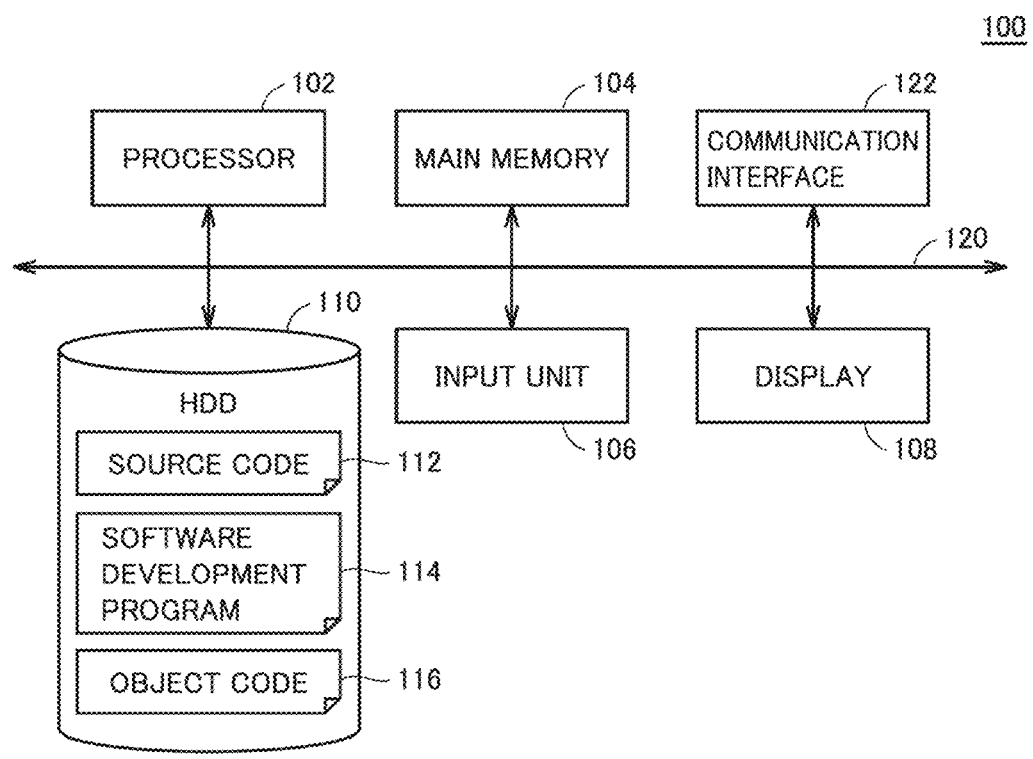
FIG. 2 is a schematic diagram showing a hardware configuration example of a software development device according to the present embodiment.

FIG. 2 is a schematic diagram showing a hardware configuration example of the software development device 100 according to the present embodiment. Referring to FIG. 2, the software development device 100 includes a processor 102, a main memory 104, an input unit 106, a display 108, a hard disk 110, and a communication interface 122 as main components. These components are connected to each other through an internal bus 120.

The processor 102 may be, for example, a CPU (Central Processing Unit) or a GPU (Graphics Processing Unit). A plurality of processors 102 may be disposed, or the processor 102 having a plurality of cores may be adopted.

The main memory 104 is a volatile storage device, such as a DRAM (Dynamic Random Access Memory) or a SRAM (Static Random Access Memory). The hard disk 110 holds various programs executed by the processor 102 or various kinds of data. In addition, instead of the hard disk 110, a non-volatile storage device such as an SSD (Solid State Drive) or a flash memory may be adopted. Among the programs stored in the hard disk 110, a designated program is loaded to the main memory 104, and the processor 102 sequentially executes computer-readable instructions included in the program loaded to the main memory 104 to realize various functions described later.

Typically, the hard disk 110 stores a source code 112 arbitrarily created by the user, a software development program 114 for realizing an integrated development environment, and an object code 116 generated from the source code 112. The software development program 114 generates the object code 116 from the source code 112 arbitrarily created by the user, and includes a module that provides a program development environment.

The input unit 106 receives an input operation of the user who operates the software development device 100. The input unit 106 may be, for example, a keyboard, a mouse, a touch panel disposed on a display device, or an operation button disposed on the housing of the software development device 100.

The display 108 displays the processing result of the processor 102 and the like. The display 108 may be, for example, an LCD (Liquid Crystal Display) or an organic EL (Electro-Luminescence) display.

The communication interface 122 is in charge of data exchange with the controller 200. Examples of the communication interface 122 include wired connection terminals, such as serial ports including a USB (Universal Serial Bus) port and an IEEE1394 and a legacy parallel port. Alternatively, the communication interface 122 may include an Ethernet (registered trademark) port.

In addition, the entirety or part of the software development device 100 may be realized by using a hard-wired circuit such as an ASIC (Application Specific Integrated Circuit) in which a circuit corresponding to computer-readable instructions is provided. In addition, the entirety or part of the software development device 100 may be realized by using a circuit corresponding to computer-readable instructions on an FPGA (field-programmable gate array). In addition, the entirety or part of the software development device 100 may be realized by appropriately combining the processor 102, a main memory, an ASIC, an FPGA, and the like.

The software development device 100 may further include a component for reading the stored program or the like from the non-transitory media that stores the software development program 114 including computer-readable instructions. The media may be, for example, an optical medium, such as a DVD (Digital Versatile Disc), or a semiconductor medium, such as a USB memory.

In addition, the software development program 114 may not only be installed on the software development device 100 through the media, but also be provided from a distribution server on the network.

(b2: Controller 200)

The controller 200 may be realized by using a general-purpose computer, or may be realized by using a semiconductor substrate including components necessary for realizing processing.

FIG. 3 is a schematic diagram showing a hardware configuration example of the controller 200 according to the present embodiment. Referring to FIG. 3, the controller 200 includes, as main components, an arithmetic processing unit 210, a wireless communication module 212, a USB controller 214, a communication controller 216, and an IO driver 218 electrically connected to one or more pads 220.

The arithmetic processing unit 210 is a calculation unit that executes a program, and includes a processor 202, a main memory 204, and a flash memory 206 as main components. The processor 202 is, for example, a CPU or a GPU. A plurality of processors 202 may be disposed, or the processor 202 having a plurality of cores may be adopted. The main memory 204 is a volatile storage device, such as a DRAM or an SRAM. The flash memory 206 is a non-volatile storage device that holds a program executed by the processor 202 or necessary data. Among the programs stored in the flash memory 206, a designated program is loaded to the main memory 204 and executed by the processor 202 to realize various functions.

The wireless communication module 212 is in charge of wireless data exchange with any other device. The wireless communication module 212 may include processing circuits and antennas for wireless communication with devices, routers, mobile base stations, and the like. The wireless communication supported by the wireless communication module 212 may be any of Wi-Fi (registered trademark), Bluetooth (registered trademark), ZigBee (registered trademark), LPWA (Low Power Wide Area), GSM (registered trademark), W-CDMA, CDMA200, LTE (Long Term Evolution), and 5th generation mobile communication system (5G), for example.

The USB controller 214 is in charge of data exchange with the software development device 100. The communication controller 216 is in charge of wired data exchange with any other device. The communication controller 216 may be compatible with known data exchange methods, such as serial communication, parallel communication, and GPIO (General-purpose input/output).

The IO driver 218 is in charge of transmitting and receiving electrical signals to and from an arbitrary device electrically connected through the pad 220. The IO driver 218 outputs an electrical signal according to a command from the arithmetic processing unit 210. In addition, the IO driver 218 detects an electrical signal given through the pad 220 and outputs the detection result to the arithmetic processing unit 210. More specifically, the IO driver 218 is configured to include a signal generation circuit, a signal detection circuit, a buffer circuit, and the like.

The controller 200 may be driven by electric power from a battery (not shown).

C. CONSTRAINTS

Next, constraints that can be set by the software development device 100 according to the present embodiment will be described.

In this specification, "constraints" include rules to be complied with in the execution of the object code 116 (assembler code) generated from the source code 112. The "constraints" may include restrictions or rules on the resources used by the object code 116 at the time of execution, restrictions or rules on the execution state of the object code 116, restrictions or rules on the execution procedure of the object code 116, and restrictions or rules on instructions included in the source code 112.

FIG. 4 is a diagram for describing constraints that can be set by the software development device 100 according to the present embodiment. The source code 112 shown in FIG. 4(A) is a code example for writing an output value determined by a predefined function fn1( ) to a designated address.

More specifically, the source code 112 includes an output value variable definition 1121 and an output value variable definition 1122. The return value of the function fn1( ) is set as a value of the output value OutValue (instruction 1123). Then, the value of the output value OutValue is written to the address "0x1000" (instruction 1124).

Constraints can be set by adding a constraint code 1125 to the source code 112 shown in FIG. 4(A). In the source code 112 shown in FIG. 4(B), a constraint code 1125 for designating an accessible memory range is added. For example, "$allowedAddressRange=0x0000 . . . 0x0FFF" means that only the addresses "0x0000" to "0x0FFF" can be accessed.

When such constraints are set, the instruction 1124 for writing the value of the output value OutValue to the address "0x1000" does not conform to the constraints. That is, the instruction 1124 cannot be executed.

The constraint code 1125 shown in FIG. 4(B) is effective for a case where the memory range of "0x0000" to "0x0FFF" is set as a non-secure area and the memory range of "0x1000" to "0x1FFF" is set as a secure area in the controller 200, for example.

As typical methods for prohibiting the execution of instructions that do not conform to constraints, (1) a method of making a determination in the process of generating the object code 116 from the source code 112 and (2) a method of making a determination when generating the object code 116 are assumed. In the method (1), a function of generating the object code 116, such as a preprocessor, a compiler, and an optimizer, evaluates conformity to constraints. On the other hand, in the method (2), in addition to the object code 116 generated from the source code 112, an object code for evaluating conformity to constraints (hereinafter, also referred to as an "object code for conformity evaluation") may be generated. An object code for conformity evaluation 118 may be included as a part of the object code 116, or may be present independently of the object code 116. Details of such an implementation example will be described later.

Next, the application range (hereinafter, also referred to as "scope") of the constraints according to the present embodiment will be described.

As shown in FIG. 4(B), basically, constraints defined by the constraint code 1125 are applied to a portion following the description of the constraint code 1125. That is, the portion following the description of the constraint code 1125 is the scope of constraints. The end position of the scope of constraints can be set arbitrarily, but basically, the scope of constraints can be the range of parentheses including the constraint code 1125.

In addition, when a procedure or function is called, the called procedure or function may also be the scope of constraints.

FIG. 5 is a diagram for describing the scope of constraints that can be set by the software development device 100 according to the present embodiment. As shown in FIG. 5, regarding the instruction 1123 to call the function fn1( ) and set the return value of the function fn1( ) as the output value OutValue, a partial source code 1126 of the called function fn1( ) may also be included in the scope of constraints.

Thus, when a call instruction is included in the scope of constraints, the software development device 100 also evaluates whether or not an instruction (procedure or function) called by the call instruction also conforms to the constraints. By sequentially inheriting the scope of such constraints, it is possible to reliably comply with the constraints by evaluating conformity to the constraints even for the source code that defines the procedure or function to be called.

FIG. 6 is a diagram for describing a case where conformity to constraints that can be set by the software development device 100 according to the present embodiment should be determined at the time of execution. FIG. 6(A) shows a source code 112 similar to the source code 112 shown in FIG. 4(B). In the source code 112 shown in FIG.

6(A), the address for writing the output value OutValue is fixed to "0x1000" (instruction 1124). By lexically analyzing and syntactically analyzing the source code 112, it can be evaluated that the source code 112 does not conform to the constraints.

On the other hand, in the source code 112 shown in FIG. 6(B), the address for writing the value of the output value OutValue is determined by using an output address initial value IniPtr. Therefore, the address to be written cannot be uniquely determined only by analyzing the source code 112.

More specifically, in the source code 112 shown in FIG. 6(B), in addition to the definition 1127 of the output address initial value variable, a process 1128 for determining the output address initial value IniPtr is defined. Then, an instruction 1129 to determine an output address, which defines that the output address OutAddrs is determined by adding "0F00" to the output address initial value IniPtr, is defined in the source code 112. Then, the value of the output value OutValue is written to the address indicated by the output address OutAddrs (instruction 1130).

In the source code 112 shown in FIG. 6(B), the value of the output address OutAddrs depends on the value of the output address initial value IniPtr, and is dynamically determined when the corresponding object code 116 is executed.

The software development device 100 according to the present embodiment provides a mechanism capable of evaluating conformity to constraints even during the execution of the corresponding object code 116 (details will be described later).

D. CONSTRAINT TYPE

As the constraints according to the present embodiment, the following types may be adopted.

TABLE 1

| No. | Restriction code | Set value | Description |
|---|---|---|---|
| 1 | $allowedAddressRange | 0x0000 . . . 0xFFFF | Designate accessible memory range |
| 2 | $allowedScopeDepth | usize (default: none) | Designate depth with effective scope $allowSelfRecursion is set to False |
| 3 | $allowedStackDepth | usize (default: none) | Designate depth of stack with effective scope $allowSelfRecursion is set to False |
| 4 | $enableRuntimeSafety | True \| False (default: True) | Enable/disable runtime security execution |
| 5 | $enforceStrictSwitches | True \| False (default: True) | Force/unforce all option designations in ( ) statement |
| 6 | $allowPanics | True \| False (default: False) | Allow/disallow panic occurrence |
| 7 | $allowUndefinedVariables | True \| False (default: False) | Availability of undefined variables |
| 8 | $allowUnreachable | True \| False (default: False) | Allow/disallow state of unreachable to designated destination |
| 9 | $allowNoReturns | True \| False (default: False) | Allow/disallow state in which return value cannot be obtained |
| 10 | $clearMemoryUponEnd | True \| False (default: false) | Whether or not to completely clear memory at the end of scope |
| 11 | $allowInputToOutput | True \| False (default: True) | Allow/disallow return from scope of designated memory |
| 12 | $allowConditionalBranches | True \| False (default: True) | Availability of conditional branches |
| 13 | $allowSelfRecursion | True \| False (default: True) | Availability of recursive call |
| 14 | $allowPtrToZero | True \| False (default: False) | Availability of pointer indicating 0x0 |
| 15 | $allowRawPointers | True \| False (default: False) | Availability of pointer indicating physical value |
| 16 | $inlineFunctionCalls | True \| False (default: False) | Force/unforce inline deployment of all functions called |

TABLE 1-continued

| No. | Restriction code | Set value | Description |
|---|---|---|---|
| 17 | $floatMode= @import("builtin").FloatMode | Strict/Optimized (default:. Strict) | Strict: execute floating-point operations in accordance with IEEE compliance Optimized: optimization for high-speed mathematical processing |
| 18 | $evalBranchQuota | Usize (default: 1000) | Backward-possible maximum number |
| 19 | $allowSubWithOverflow | True \| False (default: True) | Allow/disallow subtraction processing with overflow |
| 20 | $allowMulWithOverflow | True \| False (default: True) | Allow/disallow multiplication processing with overflow |
| 21 | $allowRem | True \| False (default: True) | Allow/disallow surplus processing |
| 22 | $allowPtrCast | True \| False (default: True) | Allow/disallow type conversion processing |
| 23 | $allowMemset | True \| False (default: True) | Allow/disallow memory block settings |

TABLE 2

| No. | Restriction code | Set value | Description |
|---|---|---|---|
| 24 | $allowIntToPtr | True \| False (default: True) | Allow/disallow integer settings for pointer |
| 25 | $allowBreakpoint | True \| False (default: True) | Allow/disallow use of breakpoints |
| 26 | $allowBitCas | True \| False (default: True) | Allow/disallow bitcast operators |
| 27 | $allowExternalCalls | True \| False (default: True) | Allow/disallow calls from external functions |
| 28 | $allowExternalVariables | True \| False (default: True) | Allow/disallow external variables |
| 29 | $allowVarArgs | True \| False (default: True) | Allow/disallow use to parameterize variables |
| 30 | $allowErrorTermination | True \| False (default: True) | Allow/disallow error stream caused by scope |
| 31 | $allowGlobalVariables | True \| False (default: True) | Allow/disallow use of global variables |
| 32 | $allowGlobalConstants | True \| False (default: True) | Allow/disallow use of global constants |
| 33 | $allowIntermediateVariables | True \| False (default: True) | Allow/disallow use of intermediate variables/intermediate constants * Intermediate variable/intermediate constant refers to a set of structures and enumeration types used in the |
| 34 | $allowIntermediateConstants | True \| False (default: True) | preceding and subsequent global scopes |
| 35 | $allowSuperVariables | True \| False (default: True) | Allow/disallow use of hypervariables/hyperconstants * Hypervariable/hyperconstant refers to a set of structures and enumeration types used only in the current scope |
| 36 | $allowSuperConstants | True \| False (default: True) | |
| 37 | $allowLocalVariables | True \| False (default: True) | Allow/disallow use of local variables |
| 38 | $allowLocalConstants | True \| False (default: True) | Allow/disallow use of local constants |
| 39 | $allowThreadLocalVariables | True \| False (default: True) | Allow/disallow use of thread for local variables |
| 40 | $allowInlineAssembly | True \| False (default: True) | Applicability of inline-deployed assembly to scope |
| 41 | $coldScope | True \| False (default: False) | Whether or not to notify the optimizer that the scope execution frequency is low |
| 42 | $secureScope | True \| False | Being set to True means the followings Set $allowInputToOutput to False Set $clearMemoryOnExit to True Set $allowConditionalBranches to False Set $enableRuntimeSafety to True Set $allowUnreachablePaths to False Set $allowUndefinedVariables to False Set $allowPanics to False Set $allowFunctionRecursion to False Set $floatMode to Strict Set $allowErrorTermination to False |

The constraints described above typically include restrictions or rules on the resources used by the object code 116 at the time of execution, restrictions or rules on the execution state of the object code 116, restrictions or rules on the execution procedure of the object code 116, and restrictions or rules on instructions included in the source code 112.

In addition, it is not necessary to implement all of the constraint codes shown in the above tables, and only some of the constraint codes may be implemented according to the required specifications. In addition, constraint codes other than the constraint codes shown in the above tables may be adopted.

E. MECHANISM FOR EVALUATING CONFORMITY TO CONSTRAINTS

Next, an example of a mechanism in which the software development device 100 according to the present embodiment evaluates conformity to constraints will be described.

FIG. 7 is a block diagram showing a functional configuration provided by the software development device 100 according to the present embodiment. Each function shown in FIG. 7 is typically realized when the processor 102 of the software development device 100 executes the software development program 114.

Referring to FIG. 7, the software development program 114 receives an input of the source code 112 and generates the object code 116 (assembler code). More specifically, the software development program 114 includes a preprocessor 1141, a compiler 1142, an optimizer 1143, and a code generator 1144.

The preprocessor 1141 performs lexical analysis and syntactic analysis on the source code 112, and controls the operations of the compiler 1142, the optimizer 1143, and the code generator 1144.

The compiler 1142 generates an object code based on the results of lexical analysis and syntactic analysis on the source code 112. The optimizer 1143 optimizes the generated object code. The code generator 1144 outputs the final object code 116 based on the result of optimization by the optimizer 1143.

When evaluating conformity to the above-described constraints, the preprocessor 1141, the compiler 1142, and the optimizer 1143 extract constraints defined in the source code 112 and evaluate conformity to the extracted constraints (step S1). In addition, the optimizer 1143 may modify the object code according to the content of the set constraints. In this manner, the software development device 100 extracts the constraints set in the source code 112, and evaluates whether or not the source code 112 conforms to the constraints within the scope of the extracted constraints.

When conformity to the extracted constraints can be evaluated only at the time of executing the object code 116, the code generator 1144 generates the object code for conformity evaluation 118 that is an assembler code for evaluating conformity to constraints (step S2).

In this manner, the software development device 100 generates the object code 116 so as to conform to the constraints.

Figure 8:
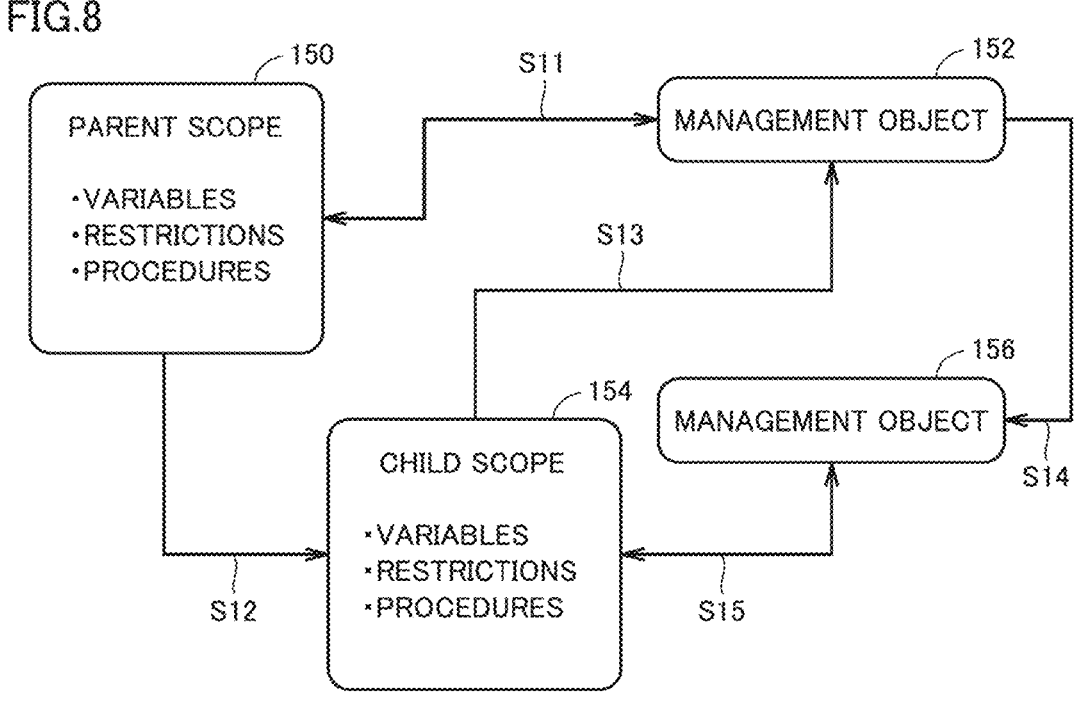
FIG. 8 is a diagram for describing a method of realizing conformity to constraints on a call in the software development device according to the present embodiment.

FIG. 8 is a diagram for describing a method of realizing conformity to constraints on a call in the software development device 100 according to the present embodiment. The process shown in FIG. 8 may be provided by the software development program 114, or may be provided by the object code for conformity evaluation 118 when the object code 116 is executed.

Referring to FIG. 8, a dataset 150 indicating a constraint scope (hereinafter, also referred to as a "parent scope") set in the procedure of a caller is generated. The dataset 150 of the parent scope includes information such as variables, constraints, and procedures. A management object 152 is also generated in association with the dataset 150 of the parent scope.

A dataset 154 indicating a constraint scope (hereinafter also referred to as a "child scope") to be inherited by the procedure of a callee is associated with the dataset 150 of the parent scope. A management object 156 is also generated in association with the dataset 154 of the child scope.

For example, when a procedure or a function is called, the management object 152 associated with the dataset 150 of the parent scope is referred to (step S11). Then, the dataset 154 of the child scope is generated based on the dataset 150 of the parent scope (step S12). In response to a reference (step S13) from the dataset 154 of the child scope to the management object 152, the management object 156 is generated from the management object 152 (step S14). The generated management object 156 is associated with the dataset 154 of the child scope (step S15).

By repeating such a series of processing, the scope of the set constraints is inherited when the procedure or the function is called.

F. PROCESSING PROCEDURE

Next, a processing procedure for generating an object code from a source code in the software development device 100 according to the present embodiment will be described.

FIG. 9 is a flowchart showing a processing procedure for generating an object code from a source code in the software development device 100 according to the present embodiment. Each step shown in FIG. 9 is typically realized when the processor 102 executes the software development program 114.

Referring to FIG. 9, the software development device 100 performs lexical analysis and syntactic analysis on the input source code 112 (step S100). The software development device 100 determines whether or not constraints are set based on the analysis results (step S102). That is, the software development device 100 extracts the constraints set in the source code 112, and evaluates whether or not the source code 112 conforms to the constraints within the scope of the extracted constraints. Here, if constraints are not set (NO in step S102), the intermediate steps are skipped, and the processing from step S118 is executed.

If constraints are set (YES in step S102), the software development device 100 selects one of the set constraints (step S104), and determines whether or not the source code included in the scope of the selected constraint conforms to the constraint (step S106).

If there is a portion of the source code included in the scope of the selected constraint that does not conform to the constraint (NO in step S106), the software development device 100 outputs a message indicating "not conform to constraint" (step S108), and the process of generating the object code 116 is interrupted (step S110). Then, the process ends. As described above, the software development device 100 stops the generation of the object code 116 when it is evaluated that the source code 112 does not conform to the constraint within the scope of the constraint.

Figure 10:
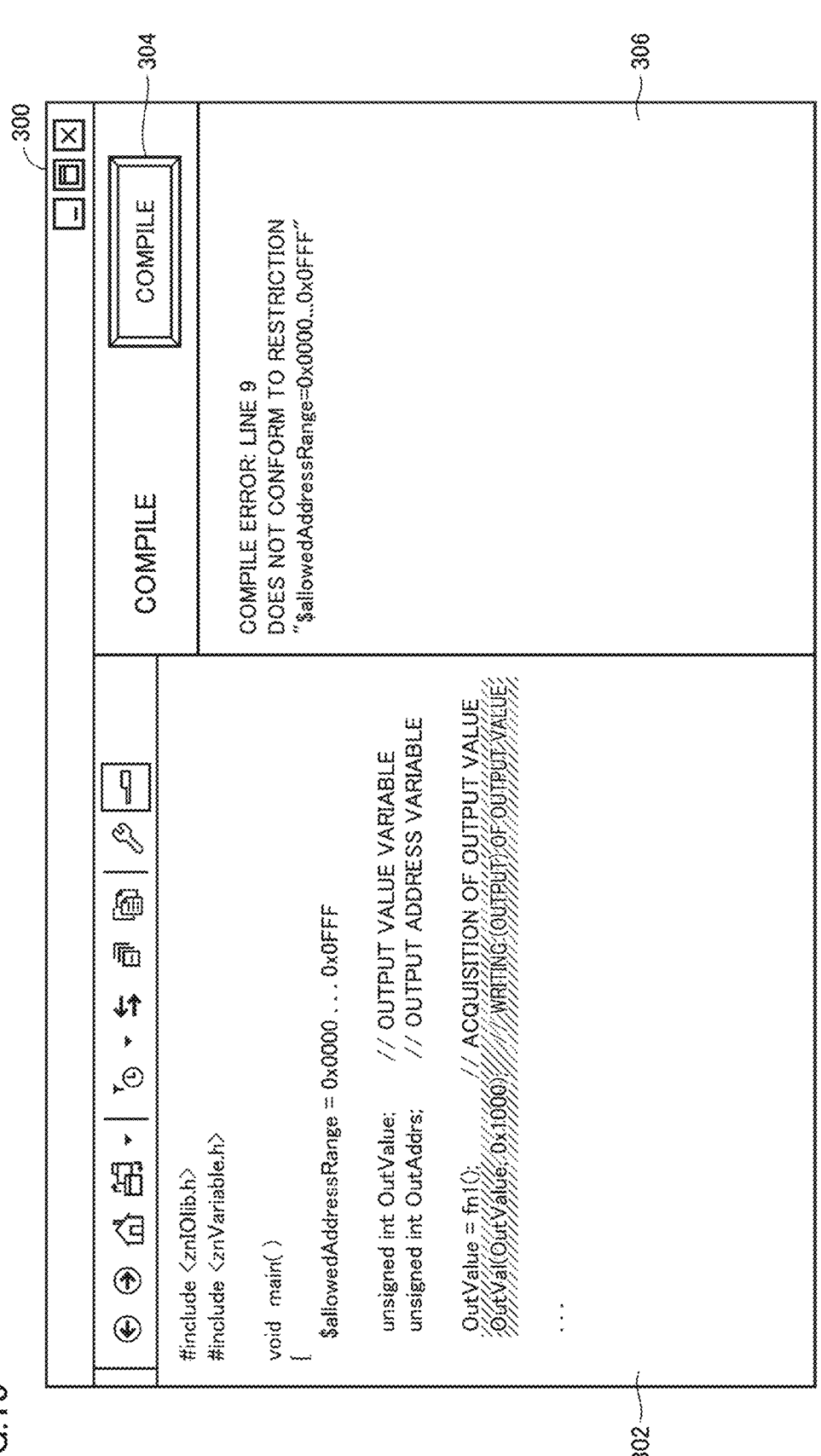
FIG. 10 is a diagram showing an example of a user interface screen provided by the software development device according to the present embodiment.

FIG. 10 is a diagram showing an example of a user interface screen provided by the software development device 100 according to the present embodiment. Referring to FIG. 10, a user interface screen 300 includes an edit area

302 for creating a source code, a compile button 304 for starting the compilation of the source code created in the edit area 302, and a message display area 306 for displaying an error message. A message indicating "not conform to constraints" may be displayed in the message display area 306.

Referring back to FIG. 9, if it cannot be determined whether or not the source code included in the scope of the selected constraints conforms to the constraints ("unknown" in step S106), the software development device 100 marks a portion where it cannot be determined whether or not the source code conforms to the constraint (step S112). Then, the process proceeds to step S114.

If all of the source codes included in the scope of the selected constraint conforms to the constraint (YES in step S106), the software development device 100 determines whether or not the evaluation for all of the set constraints has been completed (step S114). If some of the set constraints have not been evaluated (NO in step S114), the software development device 100 selects one of the unevaluated constraints (step S116), and executes the processing from step S106.

If the evaluation for all of the set constraints has been completed (YES in step S114), the software development device 100 generates the object code 116 (step S118).

Subsequently, the software development device 100 determines whether or not a portion where it cannot be determined whether or not the source code conforms to the constraint is marked (step S120). That is, it is determined whether or not any portion is marked in step S112 described above.

If a portion where it cannot be determined whether or not the source code conforms to the constraint is not marked (NO in step S120), the processing of step S122 is skipped. On the other hand, if a portion where it cannot be determined whether or not the source code conforms to the constraint is marked (YES in step S120), the software development device 100 generates the object code for conformity evaluation 118 for determining whether or not the marked portion conforms to the constraint set at the time of execution (step S122). As described above, when it is not possible to evaluate whether or not the source code 112 conforms to the constraint within the scope of the constraint, the software development device 100 generates another object code (object code for conformity evaluation 118) for evaluating whether or not the source code 112 conforms to the constraint during the execution of the object code 116 in addition to the object code 116 corresponding to the source code 112.

Finally, the software development device 100 outputs the generated object code (step S124). That is, the software development device 100 generates the object code so as to conform to the constraints included in the source code 112. Then, the process ends.

G. MODIFICATION EXAMPLE

In the above description, for convenience of explanation, a case where one constraint is set has been illustrated, but a plurality of constraint may be set in an overlapping manner without being limited thereto. In addition, a plurality of constraints may be set so that their scopes partially overlap each other.

In addition, in the above description, a configuration example in which a constraint code is embedded in the source code 112 has been illustrated, but a definition file that defines constraints may be prepared separately from the source code 112 without being limited thereto. In this case, the definition file may include information specifying a procedure name or a function name that is the scope of constraints in association with the content of constraints to be applied.

As described above, any method can be adopted as a constraint setting method.

H. ADVANTAGES

According to the software development device 100 according to the present embodiment, it is possible to provide an environment in which various constraints can be freely set for a program executed by an edge device or the like. As a result, it is possible to create a program executed by an edge device, taking into consideration various points in terms of available resources and security.

It should be considered that the embodiment disclosed is an example in all points and not restrictive. The scope of the present invention is defined by the claims rather than the above description, and is intended to include all modifications within the scope and meaning equivalent to the claims.

EXPLANATIONS OF LETTERS OR NUMERALS

1 IoT SYSTEM
2 EDGE DEVICE
100 SOFTWARE DEVELOPMENT DEVICE
102, 202 PROCESSOR
104, 204 MAIN MEMORY
106 INPUT UNIT
108 DISPLAY
110 HARD DISK
112 SOURCE CODE
114 SOFTWARE DEVELOPMENT PROGRAM
116 OBJECT CODE
118 OBJECT CODE FOR CONFORMITY EVALUATION
120 INTERNAL BUS
122 COMMUNICATION INTERFACE
150, 154 DATASET
152, 156 MANAGEMENT OBJECT
200 CONTROLLER
206 FLASH MEMORY
210 ARITHMETIC PROCESSING UNIT
212 WIRELESS COMMUNICATION MODULE
214 USB CONTROLLER
216 COMMUNICATION CONTROLLER
218 DRIVER
220 PAD
300 USER INTERFACE SCREEN
302 EDIT AREA
304 COMPILE BUTTON
306 MESSAGE DISPLAY AREA
1121, 1127 DEFINITION
1123, 1124, 1129, 1130 INSTRUCTION
1125 CONSTRAINT CODE
1126 PARTIAL SOURCE CODE
1128 PROCESSING
1141 PREPROCESSOR
1142 COMPILER
1143 OPTIMIZER
1144 CODE GENERATOR

The invention claimed is:

1. A software development device comprising:

one or more processors; and one or more memories storing computer-readable instructions which, when executed by the one or more processors, cause the one or more processors to:

extract, from a source code, a designated syntax defining constraints, determine a first scope in the source code to which constraints specified by the extracted designated syntax are applied, determine a second scope in the source code associated with the first scope, the second scope being configured to inherit the first scope, and evaluate whether a subset of the source code in the first scope and a subset of the source code in the second scope conform to the constraints specified by the extracted designated syntax;

wherein the constraints specified by the extracted designated syntax comprise at least two of:

(a) a definition of behavior of at least one of a preprocessor, a compiler, or an optimizer, (b) constraints on hardware resources of a target device used by an object code at a time of execution, (c) constraints on an execution state of the object code, or (d) constraints on an execution procedure of the object code; and wherein evaluating results in a state wherein the object code is able to be generated;

compiling the source code to generate the object code when the evaluating determines the subset of the source code in the first scope and the subset of the source code in the second scope conform to the constraints; and stopping the generation of the object code when the evaluating determines that the subset of the source code in the first scope and/or the subset of the source code in the second scope do not conform to the constraints.

2. The software development device according to claim 1, wherein the one or more processors determine the second scope comprises determining, as the second scope, a scope corresponding to a set of instructions called by a call command in the source code.

3. A software development method comprising providing one or more processors, and one or more memories storing computer-readable instructions which, when executed by the one or more processors, cause the one or more processors to:

extract, from a source code, a designated syntax defining constraints;

determine a first scope in the source code to which constraints specified by the extracted designated syntax are applied;

determine a second scope in the source code associated with the first scope, the second scope being configured to inherit the first scope; and evaluate whether a subset of the source code in the first scope and a subset of the source code in the second scope conform to the constraints specified by the extracted designated syntax;

wherein the constraints specified by the extracted designated syntax comprises at least two of:

(a) a definition of behavior of at least one of a preprocessor, a compiler, or an optimizer, (b) constraints on hardware resources of a target device used by an object code at a time of execution, (c) constraints on an execution state of the object code, (d) constraints on an execution procedure of the object code; and wherein evaluating results in a state wherein the object code is able to be generated;

compiling the source code to generate the object code when the evaluating determines the subset of the source code in the first scope and the subset of the source code in the second scope conform to the constraints; and stopping the generation of the object code when the evaluating determines that the subset of the source code in the first scope and/or the subset of the source code in the second scope do not conform to the constraints.

4. The software development method according to claim 3, wherein the determining the second scope comprises determining, by the one or more processors, as the second scope, a scope corresponding to a set of instructions called by a call command in the source code.

5. A non-transitory computer-readable storage medium having computer-readable instructions stored thereon which, when executed by one or more processors, cause the one or more processors to:

extract, from a source code, a designated syntax defining constraints;

determine a first scope in the source code to which constraints specified by the extracted designated syntax are applied;

determine a second scope in the source code associated with the first scope, the second scope being configured to inherit the first scope; and evaluate whether a subset of the source code in the first scope and a subset of the source code in the second scope conform to the constraints specified by the extracted designated syntax;

wherein the constraints specified by the extracted designated syntax comprises at least two of:

(a) a definition of behavior of at least one of a preprocessor, a compiler, or an optimizer, (b) constraints on hardware resources of a target device used by an object code at a time of execution, (c) constraints on an execution state of the object code, or (d) constraints on an execution procedure of the object code; and wherein evaluating results in a state wherein the object code is able to be generated;

compiling the source code to generate the object code when the evaluating determines the subset of the source code in the first scope and the subset of the source code in the second scope conform to the constraints; and stopping the generation of the object code when the evaluating determines that the subset of the source code in the first scope and/or the subset of the source code in the second scope do not conform to the constraints.

6. The non-transitory computer-readable storage medium according to claim 5, wherein the determining the second scope comprises determining, by the one or more processors, as the second scope, a scope corresponding to a set of instructions called by a call command in the source code.

* * * * *